United States Patent [19]

Lawrence

[11] Patent Number: 5,388,408
[45] Date of Patent: Feb. 14, 1995

[54] EXHAUST SYSTEM FOR INTERNAL COMBUSTION ENGINES

[75] Inventor: Phillip G. Lawrence, Spring Lake, Mich.

[73] Assignee: Lawrence-Keech Inc., Grand Haven, Mich.

[21] Appl. No.: 131,525

[22] Filed: Oct. 1, 1993

[51] Int. Cl.$^6$ ............................................. F01N 3/20
[52] U.S. Cl. .................... 60/324; 181/228; 181/239; 181/256
[58] Field of Search .......... 60/312, 322, 324; 181/239, 228, 256, 257, 258

[56] References Cited

U.S. PATENT DOCUMENTS

| | | |
|---|---|---|
| Re. 14,469 | 5/1918 | Nordgren . |
| D. 321,679 | 11/1991 | Shinoda ............... D12/196 |
| 330,242 | 11/1985 | Kidder . |
| 681,391 | 8/1901 | Fenner . |
| 868,416 | 10/1907 | Deetrick . |
| 942,011 | 11/1909 | Raffalovich . |
| 1,122,388 | 12/1914 | Harley . |
| 1,131,825 | 3/1915 | Cochell . |
| 1,326,647 | 12/1919 | Cotton et al. . |
| 1,382,810 | 6/1921 | Storrie . |
| 1,447,380 | 3/1923 | Goetz . |
| 1,503,918 | 8/1924 | Ruby . |
| 1,521,400 | 12/1924 | Shaw . |
| 1,682,077 | 8/1928 | Gray . |
| 1,766,103 | 6/1930 | Burgess . |
| 1,794,642 | 3/1931 | Radford . |
| 2,062,141 | 11/1936 | Newman ................ 181/57 |
| 2,078,420 | 4/1937 | Sheldrick ............... 130/54 |
| 2,096,260 | 10/1937 | Pavillon ................ 181/53 |
| 2,116,751 | 5/1938 | Deremer ................ 181/54 |
| 2,482,906 | 9/1949 | Goodwin et al. ........ 296/28 |
| 2,501,819 | 3/1950 | Kloepper ............... 180/54 |
| 2,600,236 | 6/1952 | Gibel .................. 181/56 |
| 2,658,580 | 11/1953 | Trembley .............. 181/49 |

(List continued on next page.)

FOREIGN PATENT DOCUMENTS

| | | |
|---|---|---|
| 154008 | 4/1932 | Germany . |
| 743439 | 12/1943 | Germany . |
| 55-164711 | 12/1980 | Japan . |
| 58-217714 | 12/1983 | Japan . |
| 61-178512 | 8/1986 | Japan . |
| 481480 | 3/1938 | United Kingdom . |

*Primary Examiner*—Ira S. Lazarus
*Assistant Examiner*—Daniel J. O'Connor
*Attorney, Agent, or Firm*—Price, Heneveld, Cooper, DeWitt & Litton

[57] ABSTRACT

An exhaust system for vehicles and other devices with internal combustion engines such as boats, airplanes, lawnmowers, tractors, and the like, includes a sound attenuating chamber having a single, common opening in an imperforate container providing access for exhaust gases both to and from the container while attenuating the exhaust sound thereof. The system maintains low back pressure during operation. Resonator tubes and optional sound absorbing material may be used in the chamber to control exhaust sounds. An optional, remote-operated, sound control valve upstream of the chamber allows individualized control of the exhaust sound by the vehicle driver. An optional baffle in the exhaust outlet and/or an optional helical insert in the exhaust pipe further deadens the sound. In a preferred form, the system is attached downstream of a catalytic converter and includes dual sound attenuating chambers and dual exhaust outlets at the opposite vehicle sides between the front and rear wheels.

23 Claims, 8 Drawing Sheets

U.S. PATENT DOCUMENTS

| | | | |
|---|---|---|---|
| 2,696,774 | 12/1954 | Bayley | 98/2 |
| 2,806,548 | 9/1957 | Carroll | 181/53 |
| 2,875,841 | 3/1959 | Henderson | 180/64 |
| 2,943,695 | 7/1960 | Jeffords | 181/50 |
| 2,990,907 | 7/1961 | Everett | 181/54 |
| 2,997,329 | 8/1961 | Chapman | 296/1 |
| 3,084,972 | 4/1963 | Gibson et al. | 296/28 |
| 3,116,803 | 1/1964 | Buchwald | 180/64 |
| 3,135,347 | 6/1964 | Vranyosovics | 180/64 |
| 3,140,891 | 7/1964 | Shreffler | 296/1 |
| 3,429,397 | 2/1969 | Case | 181/48 |
| 3,455,595 | 7/1969 | Wessells, III et al. | 296/28 |
| 3,578,107 | 5/1971 | Everett et al. | 181/57 |
| 3,580,628 | 5/1971 | Rantala | 296/1 |
| 3,590,947 | 7/1971 | Latch et al. | 181/53 |
| 3,685,615 | 8/1972 | Rutt | 181/35 R |
| 3,696,619 | 10/1972 | Rosa | 60/297 |
| 3,763,950 | 10/1973 | Rockwell | 180/64 A |
| 3,842,599 | 10/1974 | Ehlen | 60/273 |
| 3,942,599 | 3/1976 | Shimada | 180/64 A |
| 4,038,820 | 8/1977 | Tsukamoto | 60/314 |
| 4,142,607 | 3/1979 | Landwehr et al. | 181/259 |
| 4,186,819 | 2/1980 | Nowak et al. | 181/265 |
| 4,192,402 | 3/1980 | Nakagawa et al. | 181/256 |
| 4,225,011 | 9/1980 | Taguchi | 181/269 |
| 4,290,501 | 9/1981 | Tamaka | 181/228 |
| 4,354,565 | 10/1982 | Latter et al. | 180/54 B |
| 4,354,573 | 10/1982 | Tabata et al. | 181/239 |
| 4,381,045 | 4/1983 | Buchwalder | 181/265 |
| 4,408,675 | 10/1983 | Keller | 180/296 |
| 4,440,434 | 4/1984 | Celli | 296/185 |
| 4,444,288 | 4/1984 | Sekiya et al. | 181/258 |
| 4,522,029 | 6/1985 | Tomita et al. | 60/314 |
| 4,712,643 | 12/1987 | Iles et al. | 181/231 |
| 4,736,817 | 4/1988 | Harwood | 181/282 |
| 4,779,705 | 10/1988 | Verdin | 181/236 |
| 4,840,030 | 1/1989 | Ikeda | 60/324 |
| 4,841,728 | 6/1989 | Jean et al. | 60/312 |
| 4,913,260 | 4/1990 | Fallon | 181/254 |
| 4,926,636 | 5/1990 | Tadokoro et al. | 60/312 |
| 5,025,890 | 6/1991 | Hisashige et al. | 181/272 |
| 5,113,652 | 5/1992 | Baines et al. | 60/288 |
| 5,123,501 | 6/1992 | Rothman et al. | 181/239 |
| 5,164,550 | 1/1992 | Beidl et al. | 181/229 |

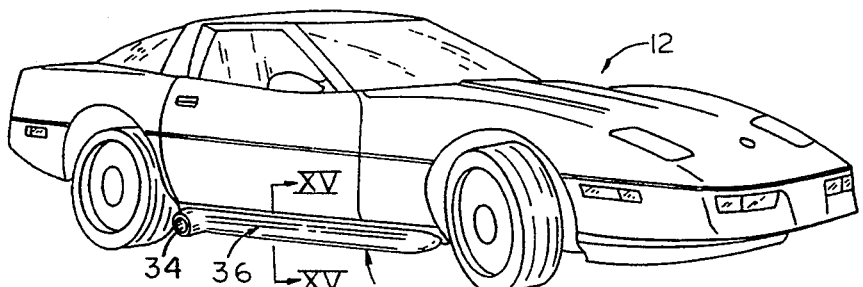
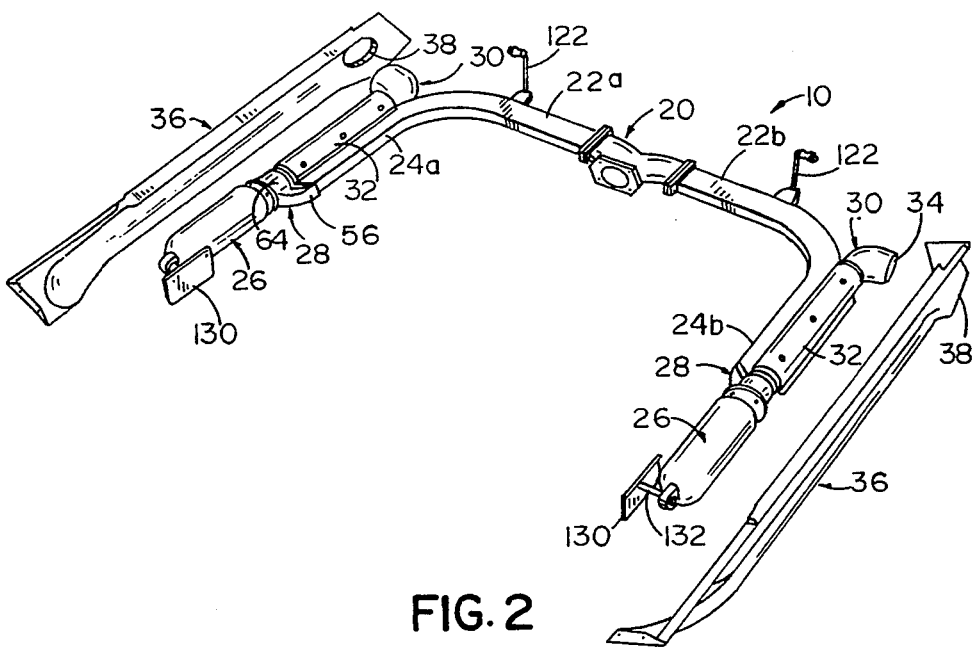
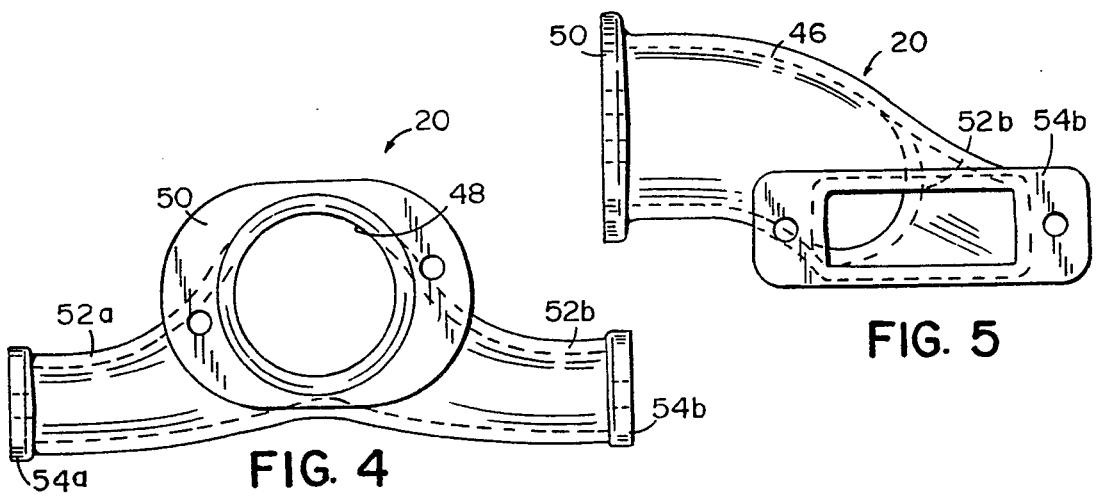

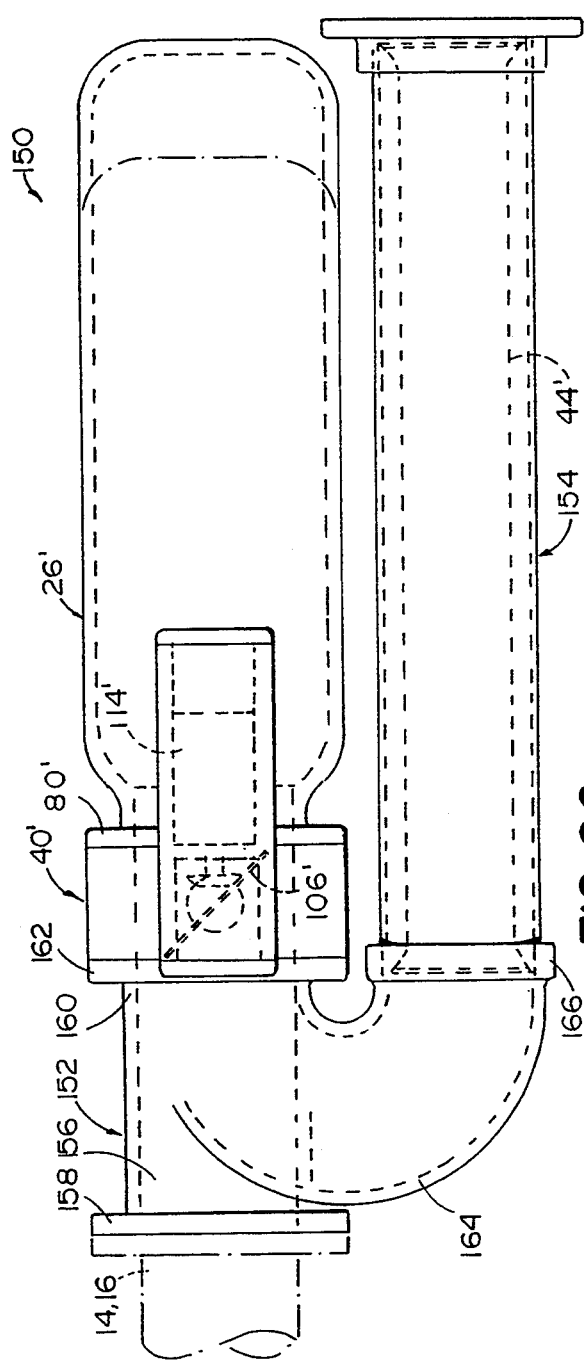
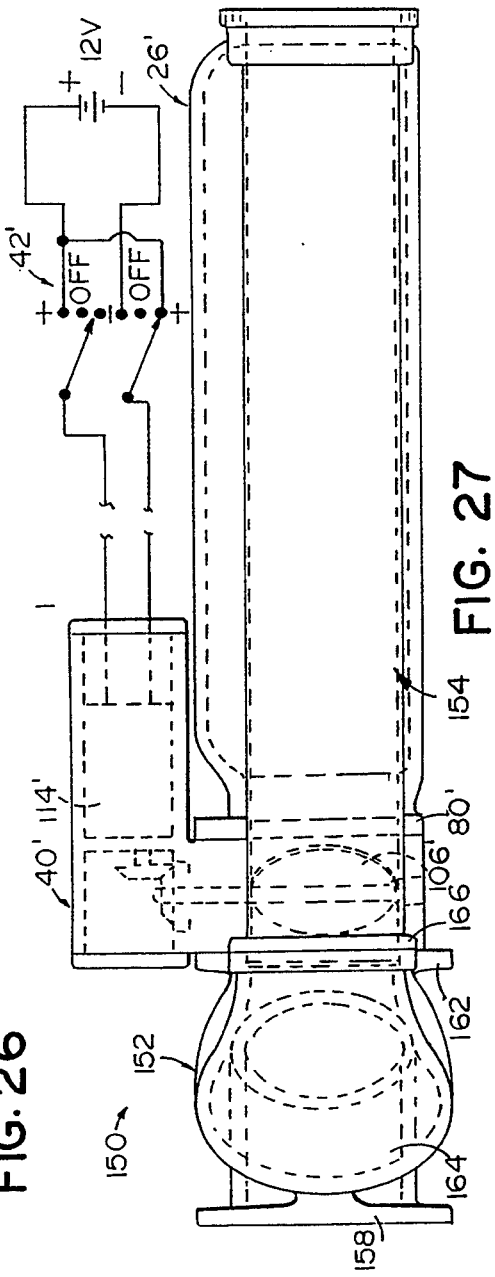

EXHAUST SYSTEM FOR INTERNAL COMBUSTION ENGINES

BACKGROUND OF THE INVENTION

This invention relates to exhaust systems for internal combustion engines and, more particularly, to an exhaust system which attenuates exhaust sounds while maintaining relatively low back pressure for enhanced engine performance.

Conventional exhaust systems for internal combustion engines include mufflers connected to exhaust pipes through which the exhaust gases from the engine are passed to deaden and muffle the sound. Due to the flow resistance for gases passing through mufflers, such systems usually create significant amounts of pressure within the exhaust system upstream of the muffler or other flow restricting device. That pressure, known as "back pressure," is transferred further upstream through the system to the engine exhaust manifolds and ultimately affects overall engine performance. Particularly, in engines for sports cars and similar vehicles, increased back pressure can significantly reduce overall engine performance. In recent years, exhaust system back pressure has been even further increased due to the use of catalytic converters now mandated by federal law to cleanse exhaust gases of harmful emissions prior to entering the atmosphere.

In the past, some high performance vehicles, such as the Chevrolet Corvette TM or other sports vehicles, have incorporated exhaust systems running from the engine manifold directly back to side mounted pipes wherein the exhaust outlet is routed to the side of the vehicle between the front and rear wheels. Such side pipes create a high performance appearance for the vehicle as well as a deeper, high performance exhaust sound. Typically, these side pipes have included an exhaust pipe mounted within a larger pipe with some type of packing material therebetween, at least in the section of the system extending along the side of the vehicle immediately ahead of the exhaust outlet. The innermost pipe in such system is usually constricted at spaced locations to help muffle and/or tune the exhaust sounds, thereby creating performance reducing back pressure. In addition to the problem of increased back pressure, the mandatory inclusion of catalytic converters for cleansing exhaust gases has made the use of such side outlet exhaust pipes difficult. Moreover, at the portions of the exhaust system exposed along the vehicle sides, the exhaust pipes could become dangerously hot and injure persons who were unaware of the system condition.

Coupled with the above problems, prior known exhaust systems, especially side pipe systems, were often difficult to install on existing vehicles, i.e., to convert such vehicles from stock, original equipment systems to higher performance systems. This was especially true on vehicles equipped with catalytic converters, the removal of which subjects the owner to possible legal sanctions. Moreover, once installed, such prior systems did not allow control over the exhaust sound emanating from the engine. If dissatisfied with the sound, the vehicle owner simply had to replace the entire system at considerable expense.

Accordingly, a need existed for an improved exhaust system for internal combustion engines especially of the higher performance variety, which system avoided substantial increases in back pressure which otherwise would detract from engine performance, allowed use with existing catalytic converter equipped vehicles, provided the ability to control engine exhaust sounds after installation of the system, avoided dangerously exposed, hot exhaust pipes, and provide for use in side pipe mounted systems, especially for high performance vehicles.

SUMMARY OF THE INVENTION

Accordingly, the present invention provides an exhaust system for internal combustion engines, and especially engines used in land vehicles, which system avoids the creation of substantial back pressure in the system, provides for ease in attachment to existing vehicles equipped with catalytic converters, provides the ability to control exhaust sounds after installation, avoids exposure to dangerously hot exhaust pipes, especially in side mounted exhaust systems, and, in a preferred embodiment, is adapted for use in side pipe exhaust systems.

In one form, the invention is an improved exhaust system adapted for mounting in a land vehicle having an internal combustion engine, front, rear and opposing sides, front and rear wheels spaced along each side, and an exhaust conduit leading from the engine and including a catalytic converter. The improved system includes an exhaust pipe connected to the exhaust conduit downstream of the catalytic converter, the pipe receiving cleansed exhaust gases after passage through the catalytic converter, and a sound attenuating chamber connected to the exhaust pipe for receiving the cleansed exhaust gases and attenuating the sound thereof. An exhaust outlet is connected to and is located downstream of the sound attenuating chamber for releasing the sound attenuated, cleansed gases to the atmosphere. The exhaust outlet is positioned adjacent one side of the vehicle between the front and rear wheels on that side such that the cleansed, sound attenuated exhaust gases are released along that one vehicle side.

In a preferred form of the invention, the sound attenuating chamber is an imperforate container having one opening to which the exhaust pipe and the exhaust outlet are both connected. If desired, one or more resonator tubes may be mounted within the container along with optional sound absorbing material to help tune the exhaust sound to a desired frequency and attenuate the sound. Each such resonator tube is preferably matched to a selected frequency of the exhaust sound from the engine.

In addition, in the preferred system, a valve means may be included upstream of the sound attenuating chamber and connected to the exhaust pipe for adjusting the sound produced by the system by controlling the flow of exhaust gases from the exhaust pipe to the sound attenuating chamber and the exhaust outlet. Preferably, such valve means includes a remote operated control in the driver's compartment of the vehicle.

Further, a perforated baffle may optionally be included in the exhaust outlet downstream of the sound attenuating chamber, or a sound reducing helical insert may be included upstream of such chamber or in another location in the system to further reduce the sound of the exhaust gases before they exit the system. Also, a heat shield and heat insulation pad are included along the portion of the system adjacent the vehicle side to help avoid injuries.

A preferred form of the system also includes a pair of sound attenuating chambers and a pair of exhaust outlets, with the exhaust pipe including an exhaust splitter housing connected to the exhaust conduit downstream of the catalytic converter. The splitter divides the exhaust pipe into two branches which each curve forwardly from the exhaust splitter to one of the sound attenuating chambers in a position parallel to one side of the vehicle. The opening of the sound attenuating chamber faces rearwardly of the vehicle with the exhaust outlet extending along the portion of the exhaust branch which extends parallel to the vehicle side. Exhaust outlets are positioned along each of the opposing vehicle sides between the front and rear wheels. Molded body side panels are preferably fitted over the exhaust outlet portions of the system.

In yet another form of the invention, an exhaust system for vehicles having an internal combustion engine producing exhaust gases includes an exhaust pipe for connection to the exhaust conduit leading from the internal combustion engine, a sound attenuating chamber connected to the exhaust pipe for receiving exhaust gases from the engine and attenuating the sound thereof, and an exhaust outlet for releasing the sound attenuated gases to the atmosphere. The exhaust outlet is connected to the sound attenuating chamber downstream of the chamber in the flow of exhaust gases. Further, a remote-operated, sound control means is mounted upstream of the sound attenuating chamber and connected to the exhaust pipe for adjusting the exhaust sound produced by the system by controlling the flow of exhaust gases from the exhaust pipes to the sound attenuating chamber. The sound control means includes a remote control adapted for operation from a remote position on the vehicle in which the system is installed such as the driver's compartment.

Accordingly, the present invention provides significant advantages over prior known exhaust systems including the provision of an exhaust system for internal combustion engines which may easily be attached and retrofitted to existing vehicles, and especially vehicles including catalytic converters, whereby the catalytic converter remains legally installed and is not disturbed, maintains low back pressure in the exhaust system providing improved performance response and torque for the engine, allows individualized control of the exhaust sounds via a driver or human activated sound control device after installation, avoids injury by preventing exposed, hot exhaust pipes when used in a side mounted exhaust system, and is especially adaptable for mounting as a side pipe system wherein the exhaust outlets release the exhaust to the atmosphere between the front and rear wheels on one or both sides of the vehicle. In addition, the exhaust system is durable and long lasting in operation, and is adaptable to other internal combustion engines such as those in boats, airplanes, lawnmowers, tractors and the like, all with similar advantages.

These and other objects, advantages, purposes and features of the invention will become more apparent from a study of the following description taken in conjunction with the drawings.

BRIEF DESCRIPTION OF THE DRAWINGS

FIG. 1 is a perspective view of a sports vehicle incorporating the exhaust system of the present invention including side exhausts between the front and rear wheels at the sides of the vehicle;

FIG. 2 is a partially exploded, perspective view of the exhaust system of the type shown in FIG. 1;

FIG. 4 is a front elevation of the exhaust splitter housing of the exhaust system of FIGS. 1-3;

FIG. 5 is a side elevation of the exhaust splitter housing of FIG. 4;

FIG. 26 is a fragmentary plan view of an alternate form of the exhaust system of the present invention;

FIG. 27 is a side elevation of the alternate exhaust system of FIG. 26.;

DESCRIPTION OF THE PREFERRED EMBODIMENTS

Figure 6:
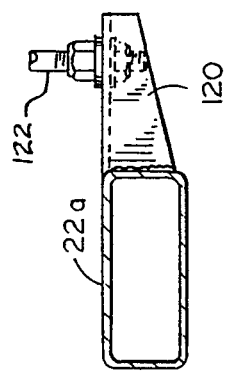
FIG. 6 is a sectional elevation of a portion of the exhaust system showing one of the mounting hangers and taken along plane VI—VI of FIG. 3.
Figure 7:
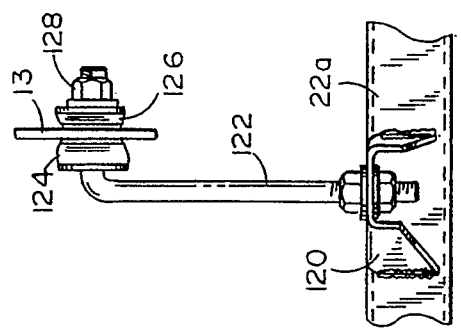
FIG. 7 is a side elevation of the exhaust system mounting hanger shown in FIG. 6.
Figure 3:
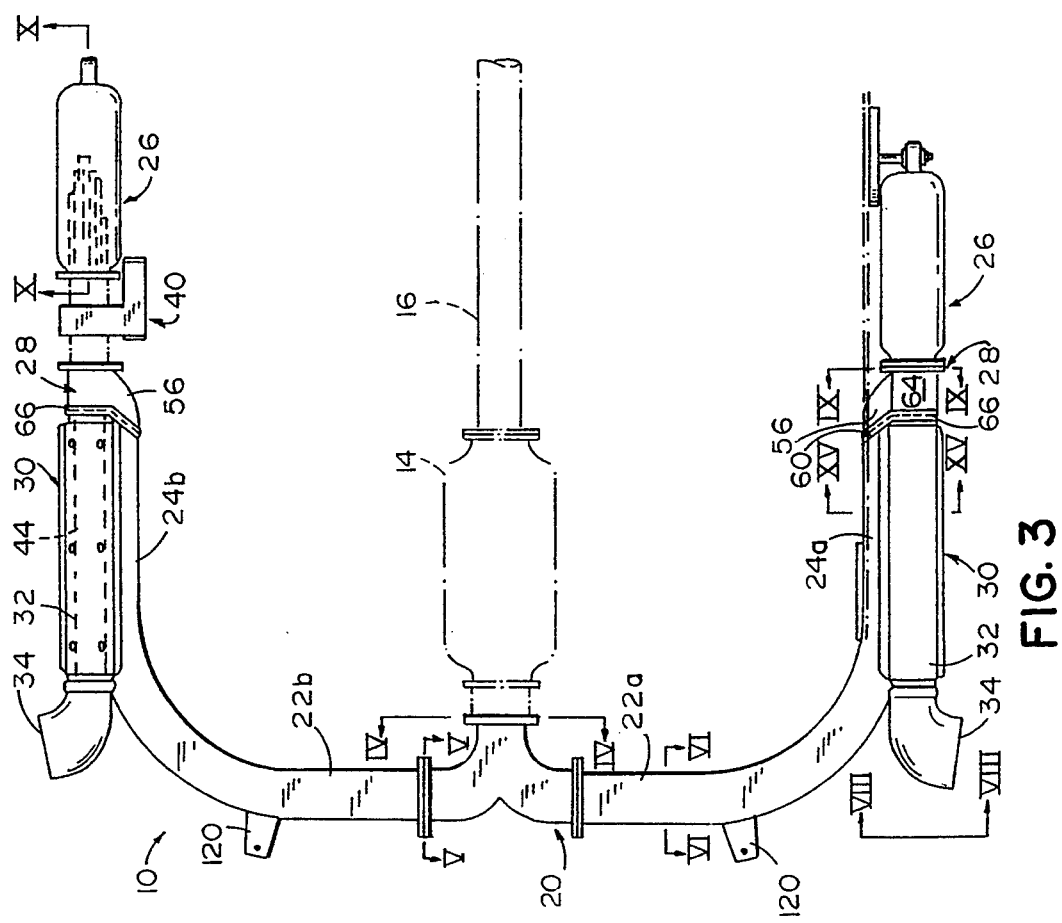
FIG. 3 is a partially exploded, plan view of the exhaust system of FIG. 2 shown attached to a standard, original equipment catalytic converter in an exhaust conduit.
Figure 8:
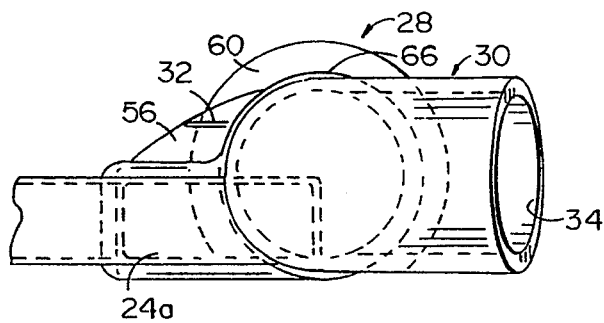
FIG. 8 is a rear elevation of the exhaust outlet portion of the exhaust system taken along line VIII—VIII of FIG. 3.

Referring now to the drawings in greater detail, FIGS. 1-3 illustrate a first embodiment 10 of the exhaust system for internal combustion engines of the present invention. Exhaust system 10 is adapted for installation on vehicles such as automobiles, and especially sports cars like the Chevrolet Corvette TM as shown at 12 in FIG. 1. Exhaust system 10 is easily installed on existing vehicles which incorporate catalytic converters 14 incorporated in existing exhaust conduits 16 (FIG. 3) leading from the internal combustion engine of the vehicle. It is especially well adapted for use in side pipe exhaust systems such as that shown in FIG. 1 where the exhaust outlets release the exhaust gases to the atmosphere between the front and rear wheels at the side of the vehicle. However, variations of the system within the scope of this invention may also be used with internal combustion engines in boats, airplanes, lawnmowers, tractors, and on other implements using such engines.

As is best seen in FIGS. 2 and 3, exhaust system 10 includes an exhaust splitter housing 20 dividing the exhaust flow into two generally L-shaped branches including exhaust pipes 22a, 22b extending in opposite directions from splitter housing 20. Each exhaust pipe 22a, 22b is generally rectangular in cross-sectional shape with its width greater than its height such that the pipe fits easily under the frame members of the vehicle while providing sufficient ground clearance. Pipes 22a, 22b extend laterally across the vehicle and curve forwardly to sections 24a, 24b which extend along the vehicle sides. Each section is connected to a separate sound attenuating chamber 26 comprising a generally imperforate container having a single, rearwardly facing opening 72 (FIG. 10) as described below. Pipe sections 24a, 24b are respectively connected through a chamber connection 28 to opening 72 of sound attenuating chamber 26. Exhaust outlets 30 are likewise connected to the same openings 72 of sound chambers 26 and include heat shields 32 welded thereto immediately ahead of exhaust openings 34 at the rear end of the outlets. The system is suspended beneath the vehicle by suitable hangers 122 and brackets 130 all as described more fully hereinafter. When installed, the outer sides of sound chambers 26 and exhaust outlets 30 are preferably covered by molded body side panels 36 having apertures 38 therethrough for receiving the exhaust openings 34 immediately forward of the rear wheels of the vehicle 12.

Alternately, should control of the exhaust sounds emanating from the system be desired after installation, a sound control valve 40 may be installed between the chamber connection 28 and sound chamber 26 on one or both sides of the dual system 10 as shown in FIG. 3. Sound control 40 includes a remote switch 42 (FIG. 16) preferably located in the driver's compartment of the vehicle for access by the driver to control the opening and closing of opening 72 to sound attenuating chamber 26 from exhaust pipe 24a or 24b before the exhaust gases exit through exhaust outlet 30. Also, if desired, a baffle insert 44 (FIGS. 18-20) may be inserted in exhaust outlet 30 to further attenuate the exhaust sounds prior to release to the atmosphere as explained below.

As shown in FIGS. 4 and 5, exhaust splitter housing 20 is a contoured body preferably cast from an aluminum alloy such as 355-T71 and includes an exhaust inlet 46 having an opening 48 surrounded by a mounting flange 50 including bolt receiving apertures therethrough allowing bolting of the flange to a corresponding flange on an exhaust conduit or directly to a previously installed catalytic converter 14 as shown in FIG. 3. Hollow exhaust inlet 46 leads rearwardly and downwardly and divides into two generally rectangularly shaped housing branches 52a, 52b having rectangularly shaped mounting flanges 54a, 54b, respectively. Flanges 54a, 54b are adapted to be bolted to L-shaped exhaust pipes 22a, 22b, respectively, each of which includes a corresponding rectangular flange welded to its inner end. Exhaust pipes 22a, 22b are preferably formed from 14 gauge steel, ductile castings as are exhaust outlets 30. The exhaust pipes and outlets are preferably covered with a high temperature resistant, powder coat finish for durability and corrosion resistance. Exhaust pipes 22a, 22b each have a rectangular cross-sectional shape corresponding to that shown for exhaust outlets 52a, 52b in FIGS. 4 and 5 and, in the preferred embodiment, are each equivalent to the cross-sectional area of a 2½ inch diameter pipe.

Figure 9:
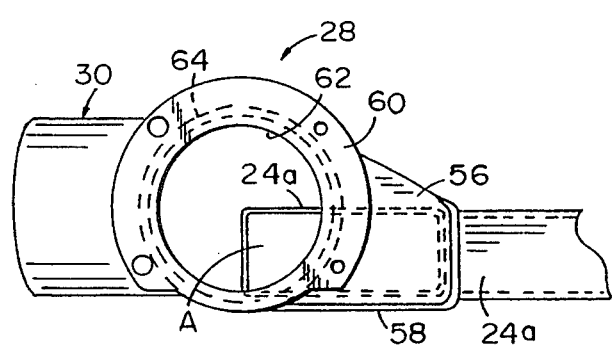
FIG. 9 is a front end elevation of the exhaust outlet portion of the exhaust system shown in FIG. 8.

Welded or otherwise secured to the forward end of exhaust pipes 24a, 24b are chamber connections 28 shown in FIGS. 2, 3, 8 and 9. Each chamber connection 28 includes an exhaust inlet 56 having an inlet mounting flange 58 welded or otherwise secured to the forward end of the exhaust pipe 24a or 24b. Inlet 56 extends forwardly while tapering and converging to a circular chamber connection flange 60 which defines a circular opening 62 corresponding to the rearwardly facing circular opening 72 of sound attenuating chamber 26. As shown in FIG. 9, the exhaust gases access sound chamber 26 through circular opening 62. The exhaust gases pressurize the sound attenuating chamber 26 as explained hereinafter, while attenuating and dissipating the exhaust sounds, following which the sound attenuated gases reverse direction to the exhaust outlet 30 through outlet portion 64 having an outlet flange 66 welded to the forward end of exhaust outlet 30. Preferably, chamber connection 28 is formed from cast ductile steel. Hence, the exhaust gases access sound chamber 26 through the single opening 62 in chamber connection 28, and initially pressurize the chamber upon start-up, and are thereafter reflected by the pressurized chamber during continued operation, as is explained more fully below.

Figure 10:
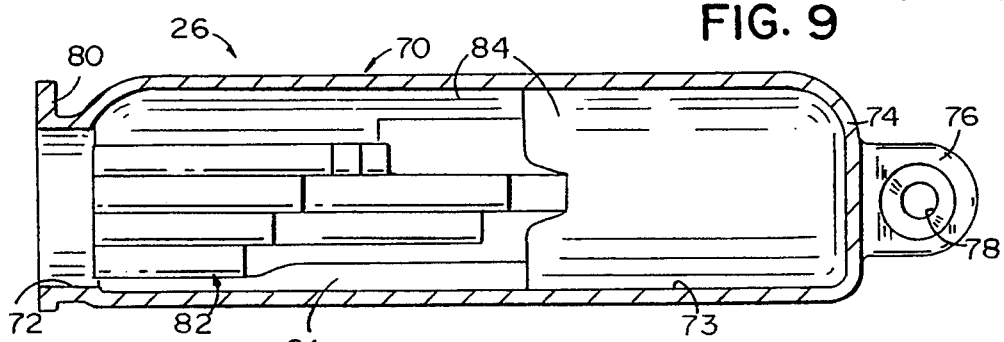
FIG. 10 is a sectional side elevation of the sound attenuating chamber of the exhaust system of FIGS. 1-3.
Figure 11:
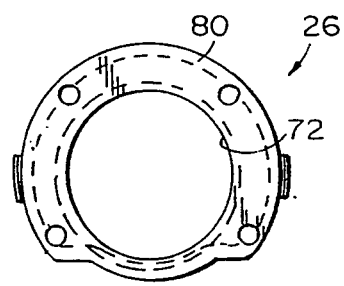
FIG. 11 is a rear end elevation of the sound attenuating chamber of FIG. 10.
Figure 12:
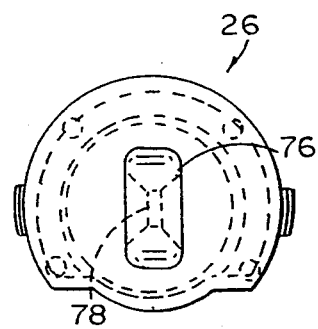
FIG. 12 is a front end elevation of the sound attenuating chamber of FIG. 10.
Figure 13:
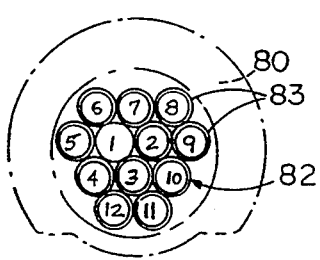
FIG. 13 is an end elevation of the resonator tube cluster mounted in the sound attenuating chamber of FIG. 10.

As is best seen in FIGS. 10-15, each of the sound attenuating chambers 26 includes an elongated, generally cylindrical container 70 formed from 319 cast aluminum alloy which is imperforate except for single opening 72 at the rear end thereof (FIGS. 10 and 13). The opposite end 74 is closed as is the remainder of the cylindrical container but includes a forwardly extending mounting flange 76 having a flared mounting aperture 78 for receiving a hanger bracket or the like as explained below. At the rear end of the container is a generally circular mounting flange 80 (FIG. 11) adapted to be bolted to mounting flange 60 of chamber connection 28 as explained above.

Figure 14:
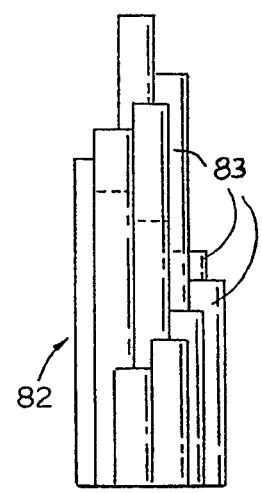
FIG. 14 is a side elevation of the resonator tube cluster shown in FIGS. 10 and 13.
Figure 15:
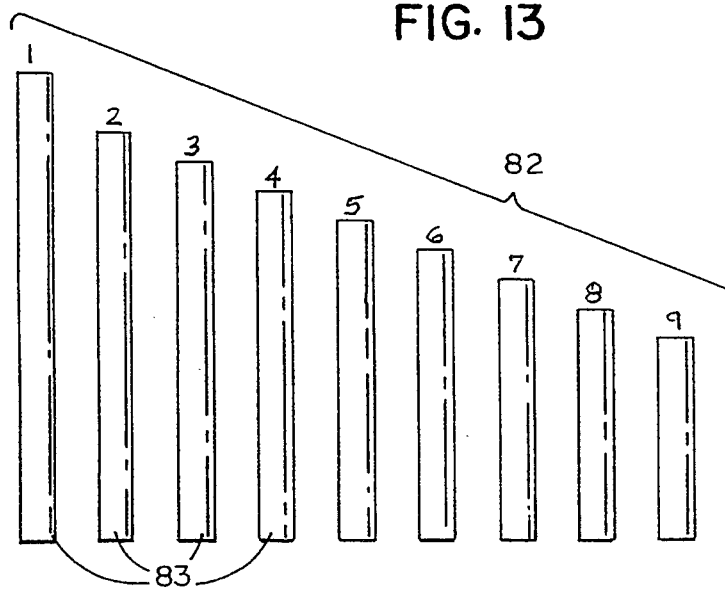
FIG. 15 is an exploded view of the resonator tubes forming the tube cluster shown in FIG. 14.

Mounted within the interior 73 of imperforate container 70 is a set or cluster 82 of cylindrical resonator tubes 83, each of which is preferably formed from rigid copper tubing. The individual tubes 83 are soldered into cluster 82. Each rigid tube 83 has a pair of open ends, one end of each being aligned in a common plane as shown in FIGS. 10 and 14. The opposite ends are staggered in a helical arrangement from shortest to longest. The length of each tube generally corresponds or is matched to one of the resonating frequencies of the exhaust system whereby a selected series of such resonating frequencies are controlled and reduced by impingement of sound waves in the exhaust gases on and reflection of sound waves within the open-ended tubes in cluster 82. As shown in FIGS. 10 and 14, the commonly aligned first ends of the tubes in cluster 82 are positioned immediately adjacent opening 72 such that the tube axes are generally parallel to the direction of elongation of cylindrical container 70. Fitted around tube cluster 82 adjacent the sides of cylindrical container 70 and extending between the second end of the longest tube and end 74 of the container is a sound absorbing material such as fiberglass matting available under model designation BGF MATT from Burlington Industries, of Burlington, N.C., having a preferred thickness of ¼ inch and coiled into a mass fitted at the end of tube cluster 82. Sound absorbing material 84 further reduces the exhaust sounds by reflecting and buffering the sound waves within the dead end interior of sound chamber 26. Once in operation, exhaust gases from the system 10 pressurize the interior of the sound attenuating chamber 26 forwardly of opening 72 and flange 80 such that subsequent exhaust gases are reflected by the pressurized chamber and do not pass through or substantially enter into the container while opening 72 allows the sound waves in those gases to dissipate within the dead end container. Following such sound dissipation or attenuation, the exhaust gases reverse direction through chamber connection 28 and outlets 64 therein into exhaust outlets 30 and out exit openings 34. Accordingly, it will be understood that the exhaust gases flow forwardly through exhaust pipes 24a, 24b to the sound attenuating chamber 26 where the sound waves are dissipated and, thereafter, in a reverse direction through exhaust outlets 30 which extend along the exterior of the rectangular exhaust pipes 24a as shown in FIGS. 2, 3, 9, 20 and 25. Preferably, each rigid tube 83 in cluster 82 has an outside diameter of ⅜ inches and a wall thickness of 0.028 inches.

Figure 18:
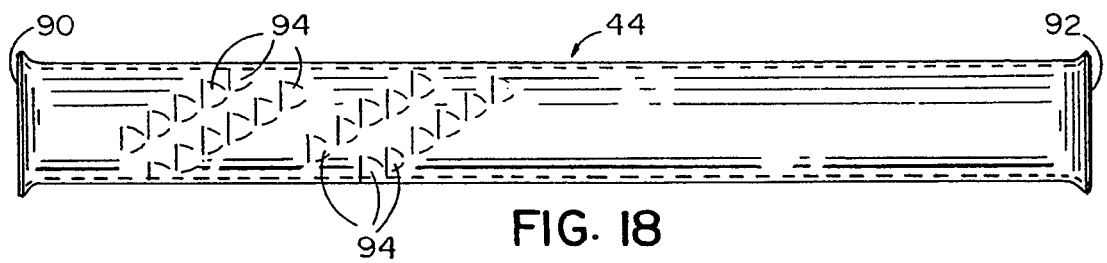
FIG. 18 is a plan view of an exhaust baffle insert for the exhaust system of FIGS. 1-3.
Figure 19:
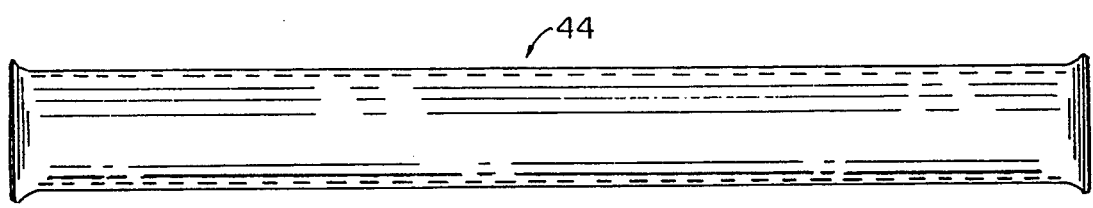
FIG. 19 is a side elevation of the exhaust baffle insert of FIG. 18.
Figure 20:
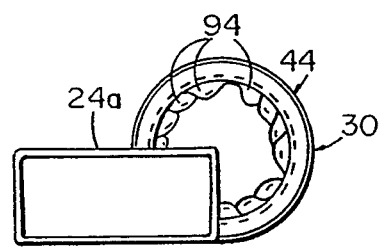
FIG. 20 is an end elevation of the exhaust outlet section of the exhaust system showing the baffle insert in place.
Figure 21:
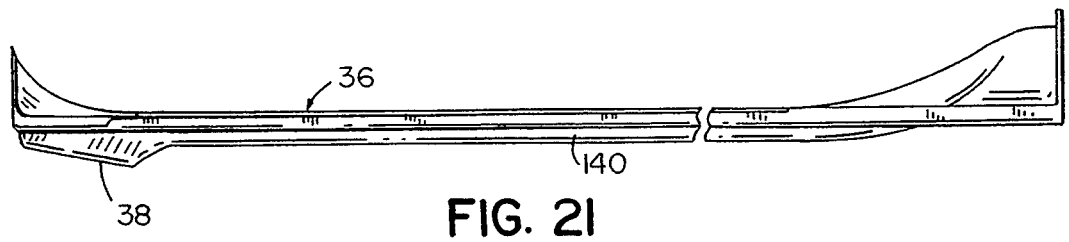
FIG. 21 is a top plan view of a body side panel incorporated with the present exhaust system.
Figure 22:
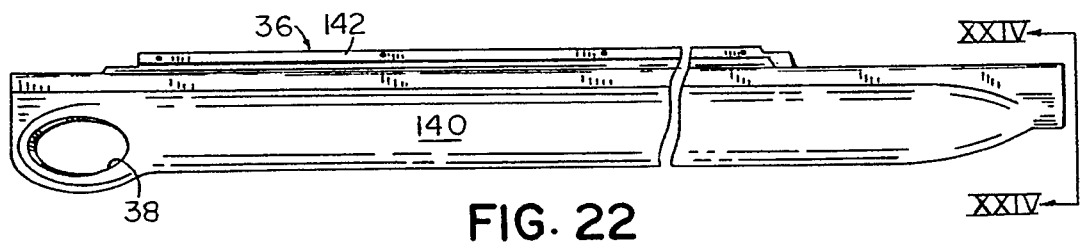
FIG. 22 is a side elevation of the body side panel of FIG. 21.
Figure 23:
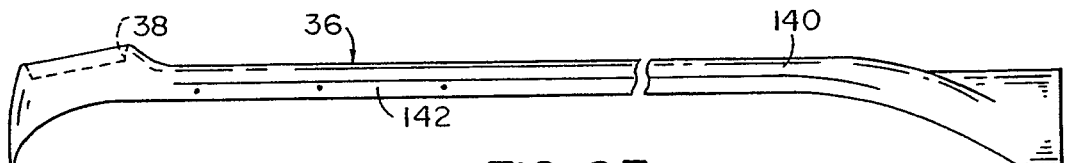
FIG. 23 is a bottom plan view of the body side panel of FIGS. 21 and 22.
Figure 24:
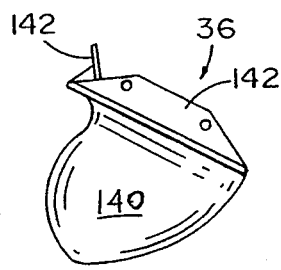
FIG. 24 is an end elevation of the body side panel taken along plane XXIV—XXIV of FIG. 22.

In the event further sound attenuation or dissipation is desired prior to release of the exhaust gases, a baffle insert 44 formed from aluminized steel tubing may be inserted within exhaust outlet 30 prior to its attachment to exhaust pipes 24a, 24b and chamber connection 28 by welding or the like. Like exhaust outlets 30, and as shown in FIGS. 18-20, exhaust baffle inserts 44 are generally cylindrical in shape with a quarter section removed but have flared ends 90, 92. Ends 90, 92 are adapted to be fitted at the forward end of exhaust outlet 30 and in the enlarged area of that outlet immediately adjacent exhaust opening 34 to hold the baffle longitudinally in place. Each baffle also includes a series of stamped, cup-shaped perforations 94 formed in the cylindrically shaped baffle plate. Each perforation has an arcuate outer surface (FIGS. 18 and 20) formed by lancing the plate and forcing a section thereof inwardly within the interior of the cylindrical baffle such that one end of the perforation is open and one end is closed. The perforations are preferably formed in a series of helical rows extending along the full length of baffle 44 with the closed ends of the perforations all facing in the same direction such that the exiting exhaust gases first engage the closed ends of each perforation. The baffle perforations 94 create a swirling turbulence which reflects the exhaust sounds around within the exhaust outlet thereby further attenuating and dissipating the sound waves.

Figure 16:
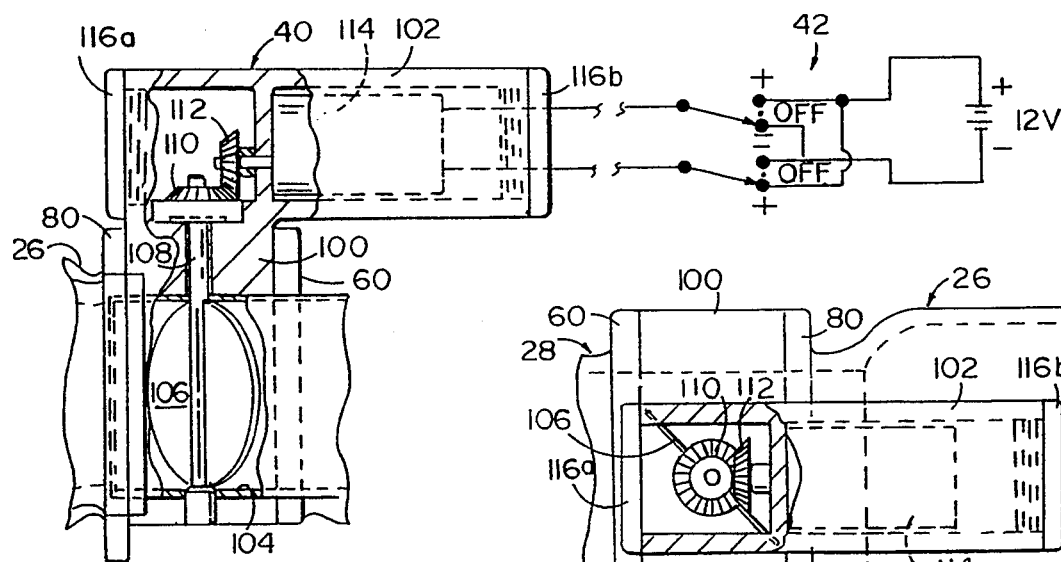
FIG. 16 is a fragmentary, sectional, plan view of the sound control valve of the exhaust system of FIGS. 1-3.
Figure 17:
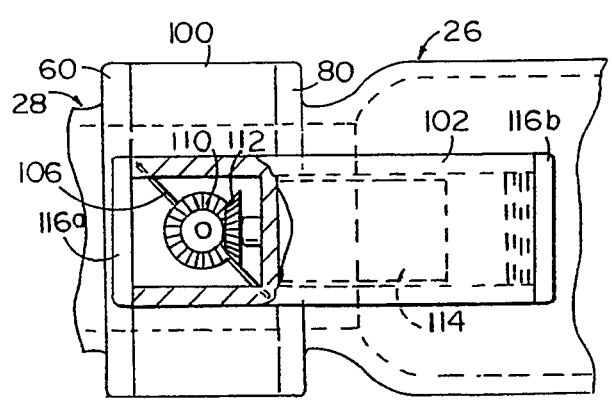
FIG. 17 is a side elevation of the sound control valve of FIG. 16.

As an option, should it be desired to individually control the exhaust sounds produced by exhaust system 10 after installation, a motorized sound control valve 40, best seen in FIGS. 3, 16 and 17, may be included in the system. Preferably, sound control valve 40 is mounted between flange 80 of sound attenuating chamber 26 and flange 60 of chamber connection 28 such that the valve is positioned immediately adjacent opening 72 but does not prevent exhaust flow between exhaust pipes 24a, 24b and exhaust outlets 30 even if the valve is closed. As shown in FIGS. 16 and 17, sound control valve 40 includes a cylindrical housing 100 formed from 319 cast aluminum merging into a transversely extending cylindrical housing 102 on one side thereof. Housing 100 has a cylindrical aperture passing therethrough corresponding in size to outlets 62, 72 to provide a passageway for the exhaust gases between the sound attenuating chamber 26 and chamber connection 28.

Fitted within passageway 104 is an imperforate, butterfly valve plate having a circular configuration matched to the cross-sectional shape of passageway 104. Plate 106 is mounted on an axle 108 extending through and across passageway 104 for support on either side thereof and has sufficient length to extend into the cylindrical interior of housing 102. Axle 108 is mounted for rotational movement on its longitudinal axis and includes a bevel gear 110 secured thereon and mating with a corresponding bevel gear 112 secured to the output shaft of a 12 volt DC electric motor 114 mounted within housing 102. Motor 114 is connected through appropriate electrical wiring and a double pole, double throw polarity reversing switch 42 (FIG. 16) which selectively connects the motor to the 12 volt electrical system of the vehicle in which the exhaust system is mounted. Housing 102 is closed on either end to seal and protect the electric motor via threaded caps 116a, 116b.

In operation, switch 42 is moved in one direction to operate motor 114 and rotate axle 108 through bevel gears 110, 112 to rotate plate 106 such that it is generally parallel to the longitudinal direction of passageway 104 thereby opening the valve and allowing exhaust gases and sound waves to impinge upon opening 72 in sound attenuating chamber 26. Movement of the switch 42 in the opposite direction, across the off position, reverses the polarity of the electrical power applied to the motor 114 causing it to rotate in the reverse direction thereby rotating axle 108 and moving plate 106 across passageway 104 to close the valve and prevent exhaust gases and sound waves from impinging upon sound attenuating chamber 26. If desired, the plate 106 may be rotated to partially opened or partially closed positions such that only a portion of the exhaust gases and sound waves to impinge on outlets 72. For each such different setting of the sound control valve, the sound produced by the exhaust system is modified. The sound ranges from a loud, full performance sound when the valve plate 106 is closed across passage 104, to a softer, attenuated deadened sound when the valve plate is fully opened. The driver of the vehicle can modify the sound produced by the exhaust system by controlling switch 42 prior to, during or after any driving sequence. The sound of the exhaust system may thus be changed to the desire of the owner/operator after the system is installed.

Installation of exhaust system 10 in a vehicle such as that shown at 12 in FIG. 1 is made by removing the original exhaust system downstream from the catalytic converter 14 and attaching system 10 thereto. Specifically, exhaust splitter housing 20 is secured via mounting flange 50 to the catalytic converter mounting flange while a series of hanger supports attach and suspend the remainder of the exhaust system from the vehicle frame. As shown in FIGS. 2, 3, 6 and 7, a pair of U-Shaped hanger support plates 120 are welded to the rear surface of exhaust pipes 22a, 22b, respectively. Each support plate 120 receives an upstanding, L-shaped hanger arm 122 bolted to the support plate and including a pair of rubber mounts 124, 126 secured in place on either side of vehicle frame 13 by a suitable threaded nut or other fastener 128. At the forward end of the system 10, a pair of mounting plates 130, each including an outwardly extending stud or rod 132 (FIG. 2), are bolted to the vehicle frame. Studs 132 are received through apertures 78 on the forward end of sound attenuating chambers 26 and bolted in place. Suitable rubber mounting members such as those shown at 124, 126 on hanger supports 122 may also be included on the ends of studs 132 on either side of mounting flange 76. Accordingly, exhaust system 10 is suspended from the vehicle frame in a shock absorbing fashion via rubber mounts 124, 126 for noise reduction during use.

Figure 25:
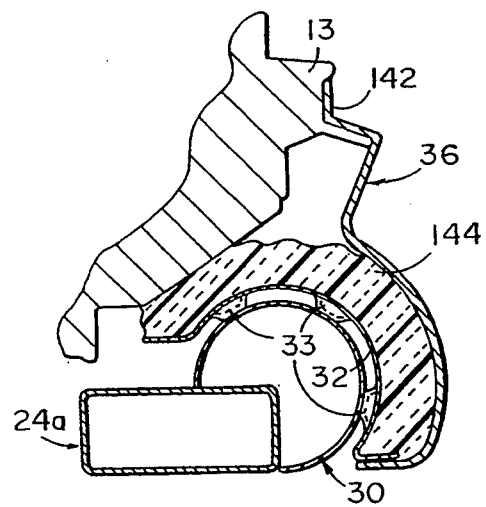
FIG. 25 is a sectional end elevation of the exhaust system installed on a sports vehicle of the type shown in FIG. 1 and taken along plane XXV—XXV of FIGS. 1 and 3.

After installation and suspension from the vehicle frame, body side panels 36 (FIGS. 2 and 21-25) may be installed to complete the system on vehicle 12. As shown in FIGS. 21-25, each body side panel 36 is preferably resin transfer molded from a fiberglass composite and heat resistant resin combination preferably obtained from Nero Plastics, Inc., of Owosso, Mich., under resin system no. ICI, Modar 824 LTS. Alternately, panels 36 could be hand laid-up or sheet molded. Body side panels 36 are molded to include a bulbous portion 140 receiving the exhaust outlet 30 on the interior side thereof such that exhaust opening 34 extends through opening 38 at the rear of the body side panel. A series of securing flanges 142 on each side panel is bolted to the under side of the vehicle to hold the panel in place as shown in FIG. 25. Intermediate the vehicle frame 13 and the body side panel a heat insulation pad 144 may optionally be included. When used, heat insulation pad 144 fills the space between panel 36 and the exterior of heat shield 32 which is preferably cylindrically shaped from 18 gauge steel and tack welded to the exterior surface of exhaust outlet 30. Heat shield 32 preferably includes standoffs 33 which space the heat shield about $\frac{1}{4}$ inch from the exhaust outlet to provide heat dissipation. Further heat insulation is provided via pad 144 such that, during use, body side panel 36 is shielded from the majority of the heat of the exhaust system and is only warm to the touch.

Once installed in the manner described above, exhaust system 10 receives cleansed exhaust gases from the vehicle engine through exhaust conduit 16 and catalytic converter 14. Splitter housing 20 divides the gases into two flow streams each exiting the splitter housing in opposite lateral directions through exhaust pipes 22a, 22b. The dual exhaust flow is routed forwardly into chamber connection 28 on each side of the vehicle and, thence, to opening 72 of each sound attenuating chamber 26. Exhaust gases accompanied by sound waves initially flow into interiors 73 of chambers 26 through tube clusters 82 which, as noted above, are matched to various resonate frequencies in the system. While the tube lengths for cluster 82 may be set by the trial and error method, another method is to tune the length of such tubes by inducing sound frequency in the system via a signal generator. The length of the individual tubes is then set to match each frequency desired to be controlled such that, by using multiple tubes in clusters 82, multiple resonating frequencies within the system are controlled. After passing through tubes 82, the gases and sound waves pass into the sound absorbing material 84 if included in the chamber 73. After a period of time, the pressure of the exhaust gases within interior 73 of chambers 26 builds up such that exhaust gases do not flow into the interiors 73. However, since the sound waves present in the exhaust gases are directed by exhaust pipes 24a, 24b through chamber connections 28 into the dead end chamber containers, the sound waves are controlled by passage into and through tube clusters 82 and by reflection and damping within the chamber interiors. Use of the optional sound absorbing material 84 enhances that effect. Due to the pressure build-up in the containers 26, the flow of exhaust gases is caused to reverse itself through chamber connections 28 such that the flow doubles back and passes rearwardly through exhaust outlets 30 to exhaust openings 34 after the initial start-up period. Due to the fact that little or no gases are passing into or through sound attenuating chambers 26 after initial start-up, the flow of exhaust gases is maintained relatively clear and free through the pipes, chamber connections, and exhaust outlets thereby maintaining relatively low back pressure and avoiding any significant performance dampening effects on the engine itself. Simultaneously, however, the exhaust sounds are lowered, muted, dampened and muffled due to attenuation of the sound waves in chambers 26. Further sound deadening can be enhanced by inclusion of exhaust baffle inserts 44 fitted within exhaust outlets 30 during assembly. However, use of such baffle inserts does increase the back pressure present in the system somewhat although the sound is further muffled and deadened due to such inserts.

In addition, use of the optional sound control valve 40 in one or both sides of the system 10 allows the driver of the vehicle to set and tune the exhaust system to his individual desires by opening or closing valve plate 106 via electric motor 114 and switch 42. By closing sound control valve 40, sound waves in the exhaust gases are prevented from entering the sound attenuating chambers 26 and are reflected rearwardly through the exhaust outlets to openings 34 providing a louder, high performance exhaust sound. Opening valve 40 allows the sound waves to enter the chambers for attenuation and dampening. Valve settings intermediate the opened and closed positions provided individually desired settings for reflection of varying amounts of sound waves between these opened and closed extremes. However, back pressure remains unaffected by valve 40, whether opened or closed. In addition, heat shield 32, and heat insulation layer 144 prevent the heat of the exhaust gases from being transferred through outlets 30 to body side panels 36 thereby avoiding potential injury. As is also apparent, the system can be easily installed without disturbing factory installed catalytic converters thereby maintaining compliance with all federal exhaust emission requirements while providing a tuned, controllable exhaust sound and increased engine performance.

As noted above, back pressure within the exhaust system 10 is maintained at a relatively low level during operation. Such back pressure is typically tested on a test bench by placing the stock exhaust system for the vehicle in question on a test stand and establishing a predetermined air flow in cubic feet per minute through the system. The pressure at one or more points in the system based on such flow is then measured. Exhaust system 10 is then placed on the test bench and an identical air flow input is established, followed by measurement of the back pressure present in the system at selected points.

As shown in FIGS. 26 and 27, a second embodiment 150 of the exhaust system is shown for use in vehicles where side pipes or side exiting exhaust systems are not desired. In system 150, exhaust conduit 16 and/or catalytic converter 14 direct exhaust gases from an internal combustion engine into and through a modified chamber connection 152 and optional sound control 40' similar to sound control 40 described for system 10, and into a sound attenuating chamber 26' similar to chambers 26 described above. Chamber connection 152 is adapted to direct the flow of exhaust gases from valve 40 and/or chamber 26 in a reverse direction and then redirect the gases rearwardly through an exhaust outlet tube 154 and on to any desired exhaust openings at the rear of the vehicle. System 150 is thus referred to as a "in line" system.

With reference to FIGS. 26 and 27, chamber connection 152 formed from cast aluminum includes a tubular inlet 156 having a mounting flange 158 adapted for connection to conduit 16 or catalytic converter 14. Inlet 156 has a generally circular configuration and extends to an exit end 160 at which mounting flange 162 connects to sound control valve 40' or mounting flange 80' of sound attenuating chamber 26'. Imperforate valve plate 106' in valve 40' may be opened or closed via motor 114' and switch 42' to change the exhaust sound in the manner described above for system 10. Similarly, sound attenuating chamber 26' may include a resonator tube cluster and optional sound absorbing material to attenuate and dampen exhaust noises in the same manner as in system 10.

After initial start-up, exhaust gases are redirected from the entrance to sound attenuating chamber 26' or valve 40' through an annular passage 164 which curves through 180° from the mounting flange 162 to an exit mounting flange 166 at which exhaust outlet tube 154 is connected to direct sound attenuated exhaust gases rearwardly of the vehicle. Operation of exhaust system 150 is substantially similar to that described above for system 10 except that sound attenuated gases are directed rearwardly of the vehicle without exiting at the sides of the vehicle and a single exhaust outlet is provided. In addition, exhaust baffle inserts 44 may be included in exhaust outlet 154 if desired for further sound dampening. Back pressure is maintained at a low level in system 150 just as in system 10 while exhaust sounds are controllable via sound control valve 40' in the same manner as for system 10.

With reference to FIGS. 28–31, a third embodiment 200 of the exhaust system is illustrated. Exhaust system 200 is adapted for installation on vehicles similar to those with which exhaust system 10 is used but which include a pair of catalytic converters 14. In such vehicles, one catalytic converter is typically included in an exhaust pipe leading from each side of the internal combustion engine. As with system 10, exhaust system 200 is easily retrofitted to existing vehicles without disruption of the existing catalytic converters 14, and may also be used as a side pipe exhaust system such as those shown in FIG. 28. Again, variations of system 200 within the scope of this invention may also be used with internal combustion engines in boats, airplanes, lawnmowers, tractors, and on other implements using such engines.

Figure 28:
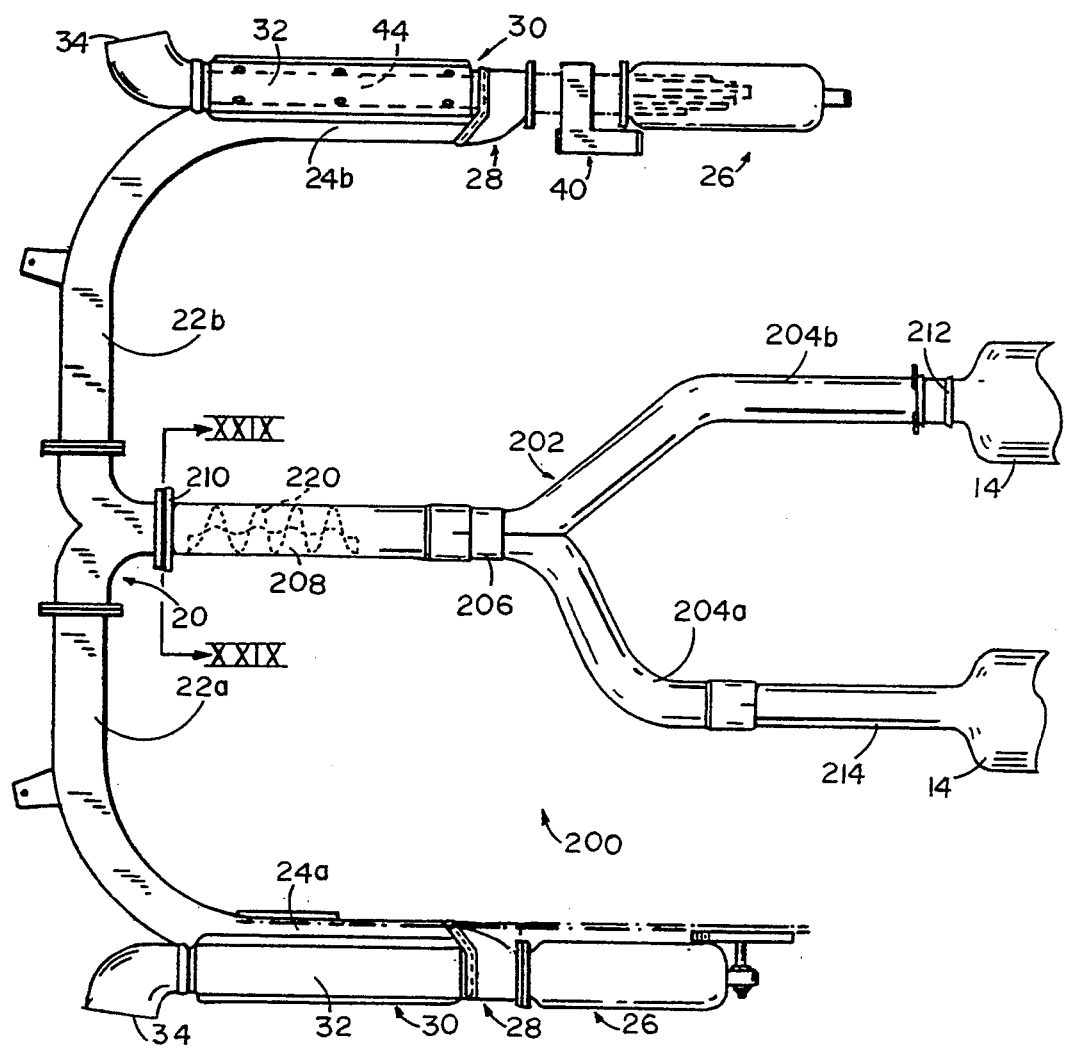
FIG. 28 is a partially exploded, plan view of an alternative embodiment of the exhaust system similar to that shown in FIG. 2 but adapted to connect with a pair of catalytic converters, one connected to each side of a vehicle engine.

As shown in FIG. 28, system 200 includes a Y-shaped exhaust pipe 202 which connects the pair of catalytic converters 14 to exhaust splitter housing 20 and the remainder of the side pipe exhaust system which is, from splitter housing 20 on, substantially identical to system 10. Pipe 202 includes branches 204a, 204b which converge to a common outlet 206 joined to an exhaust passageway 208 having a mounting flange 210 at the downstream end thereof. Branches 204a, 204b, outlet 206, and conduit 208 all preferably have a circular cross-sectional shape although other shapes such as rectangular are also possible. Branch 204b includes an outwardly flared upstream end adapted to mate with the downstream end of one of the catalytic converters 14, while branch 204a includes an enlarged upstream end adapted to receive telescopically therewithin a catalytic converter lead pipe 214. Accordingly, Y-shaped pipe 202 causes the cleansed exhaust gases and sound waves from catalytic converters 14 to be merged at outlet 206 for passage through conduit 208 into exhaust splitter 20 where the combined exhaust streams are again split into branches 22a, 22b for further sound attenuation in the manner described above for system 10.

Figure 30:
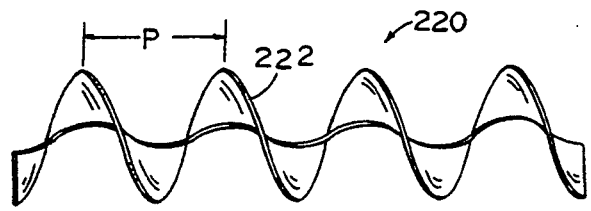
FIG. 30 is a side elevation of the sound reducing helical insert/auger included in the exhaust system of FIG. 28.
Figure 29:
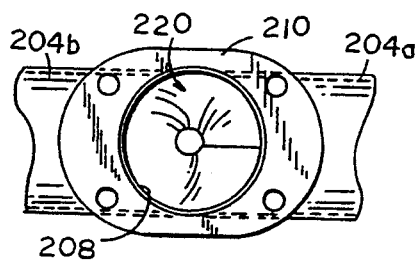
FIG. 29 is an end view of a portion of the exhaust system taken along plane XXIX—XXIX of FIG. 28.
Figure 31:
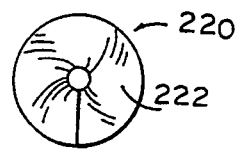
FIG. 31 is an end view of the helical insert/auger shown in FIG. 30.

When used as described above, Y-shaped exhaust pipe 202 creates little or no additional back pressure in the exhaust system. If additional sound dissipation or attenuation is desired beyond the sound chambers 26, sound attenuating valves 40, and baffle inserts 44, a helical insert or auger 220 may be mounted within conduit 208 and secured in place such as by welding as shown in FIGS. 28–31. As is best seen in FIGS. 30 and 31, helical/auger insert 220 is a length or ribbon 222 of steel or other heat resistant material twisted or otherwise formed into a helical shape having a desired pitch P between the sections of the helix and a desired overall length (FIG. 30). A combination of length and pitch for helical insert 220 will provide a desired exhaust sound due to the swirling, helical motion imparted to the exhaust gases and the resultant reflection of sound waves therein off the sides of conduit 208 and surface portions of insert 220 as the sound waves pass continuously therethrough in conjunction with the exhaust gases from the engine. Preferably, helical insert 220 has an overall length of about 12 inches, a pitch length of about 3 inches, and a diameter of about 2 13/16 inches.

Although a twisted metal ribbon forming insert 220 is shown, the helical insert or auger 220 can also be formed using other methods such as twisting a flat metal bar or molding another heat resistant material into the helical shape. Helical insert 220, although preferably mounted in conduit 208 downstream of catalytic converter 14 and upstream of sound attenuating chambers 26, could also be substituted for baffle inserts 44 downstream of sound attenuating valves 40 and sound chambers 26, in which case a pair of such helical inserts are used in the system. Likewise, inserts 220 can be mounted in other positions within the exhaust system while accomplishing the same sound dissipating function.

In operation, exhaust gases and sound waves exiting from the pair of catalytic converters 14 are merged at outlet 206 in the Y-shaped pipe and are passed through the helical insert 220 before entering exhaust splitter housing 20. The insert 220 causes the gases to move in a helical motion and creates multiple reflective surfaces for the sound waves such that they are reflected off surfaces of both the insert and the walls of the exhaust conduit thereby dissipating and attenuating them before entering exhaust splitter housing 20. Such operation does create a slight increase in the exhaust back pressure in system 200 as compared to the system 200 without helical insert 220.

Accordingly, the present invention provides a durable, highly versatile exhaust system which enhances engine performance by maintaining low back pressure within the system while allowing tuning and setting of exhaust sounds to individual desires.

While several forms of the invention have been shown and described, other forms will now be apparent to those skilled in the art. Therefore, it will be understood that the embodiments shown in drawings and described above are merely for illustrative purposes and are not intended to limit the scope of the invention which is defined by the claims which follow.

The embodiments of the invention in which an exclusive property or privilege is claimed are as follows:

1. In a land vehicle having an internal combustion engine, a front, a rear and opposing sides, front and rear wheels spaced along each side and an exhaust conduit leading from said engine and including a catalytic converter, an improved exhaust system comprising:
   an exhaust pipe connected to said exhaust conduit downstream of said catalytic converter, said pipe receiving cleansed exhaust gases after passage through said catalytic converter;
   a sound attenuating chamber connected to said exhaust pipe for receiving the cleansed exhaust gases and attenuating the sound thereof; and
   an exhaust outlet connected to and downstream of said chamber for releasing the sound attenuated, cleansed gases to the atmosphere, said exhaust outlet being positioned adjacent one side of said vehicle between said front and rear wheels on said one vehicle side whereby the cleansed, sound attenuated exhaust gases are released along said one vehicle side.

2. The improved exhaust system of claim 1 wherein said sound attenuating chamber includes means for attenuating the sound of the exhaust gases while maintaining low back pressure in said exhaust system.

3. The improved exhaust system of claim 2 wherein said means for attenuating the exhaust sound include an imperforate container having one opening therein; said exhaust pipe connected to said opening for access of the cleansed exhaust gases to said chamber; said exhaust outlet also connected to said opening for receiving the sound attenuated, cleansed gases from said chamber and exhaust pipe.

4. The improved exhaust system of claim 3 wherein said sound attenuating chamber includes at least one tube therein for receiving exhaust gases to control resonation of the exhaust sounds from said engine.

5. The improved exhaust system of claim 3 wherein said sound attenuating chamber includes a plurality of tubes therein for receiving exhaust gases to control resonation of exhaust sounds from said engine.

6. The improved exhaust system of claim 5 wherein each of said tubes has a length matched to a desired sound frequency of the exhaust.

7. The improved exhaust system of claim 5 wherein said sound chamber also includes a sound absorbing material fitted around said tubes for further attenuating exhaust sounds.

8. The improved exhaust system of claim 3 including valve means upstream of said sound attenuating chamber and connected to said exhaust pipe for adjusting the sound produced by said system by controlling the flow of exhaust gases from said exhaust pipe to said sound attenuating chamber.

9. The improved exhaust system for claim 8 wherein said valve means includes at least one open position for providing access of the exhaust gases to said opening of said sound attenuating chamber, and a closed position for closing said opening to said sound attenuating chamber, and means for controlling the position thereof between and including said open and closed positions.

10. The improved exhaust system of claim 9 wherein said means for controlling the position of said valve means include a remote operated control operable from a remote position on said vehicle such as the driver's compartment of said vehicle.

11. The improved exhaust system of claim 8 wherein said valve means is mounted adjacent to and upstream of said opening to said sound chamber container; said valve means being a butterfly-type valve including an imperforate plate matching the shape of the interior of said exhaust pipe and mounted for pivotal movement on an axle, said plate being pivoted across said pipe interior in said closed position and pivoted to a position generally parallel to said pipe in said open position; said valve including motive power means for pivoting said axle and plate between said open and closed positions.

12. The improved exhaust system of claim 11 wherein said motive power means is an electric motor including a switch mounted for access in said driver's compartment, said motor including gear means connected to said axle for pivoting said axle and plate when said electric motor is operated.

13. The improved exhaust system of claim 8 including a perforated baffle in said exhaust outlet downstream of said sound attenuating chamber, said baffle reducing the sound of the exhaust gases before they exit said system.

14. The improved exhaust system of claim 13 wherein said perforated baffle is a plate having a series of openings formed therein, said plate having curved outer surfaces defining said openings, said curved outer surfaces merging with said plate to define closed ends on said openings, said openings being directed downstream in said exhaust outlet, said closed ends facing upstream.

15. The improved exhaust system of claim 14 wherein said plate is curved in the shape of a cylinder, said openings being aligned helically around said cylinder.

16. The improved exhaust system of claim 13 wherein said exhaust pipe is curved forwardly from said exhaust conduit to said sound attenuating chamber and has one section extending generally parallel to said one side of said vehicle, said opening to said sound attenuating chamber facing rearwardly of said vehicle, said exhaust outlet extending along said one section of said exhaust pipe.

17. The improved exhaust system of claim 16 wherein said valve means is connected to said outlet of said sound attenuating chamber and said exhaust pipe adjacent said one side of said vehicle, said perforated baffle being mounted within said exhaust outlet along said one section of said exhaust pipe.

18. The improved exhaust system of claim 16 including a plurality of hangers for mounting said system to said vehicle; at least one of said hangers including a resilient, shock absorbing mounting member for engaging said vehicle.

19. The improved exhaust system of claim 16 wherein said exhaust pipe is rectangular in section.

20. The improved exhaust system of claim 16 including a side panel mounted on said vehicle along said one side and covering said exhaust outlet, said side panel having an opening allowing the exhaust gases to exit therethrough; a heat shield extending along and secured to said exhaust outlet; and a heat insulation pad intermediate said heat shield and said side panel.

21. The improved exhaust system of claim 3 including a pair of sound attenuating chambers and a pair of exhaust outlets; said exhaust pipe including an exhaust splitter connected to said exhaust conduit and dividing said exhaust pipe into two branches, each exhaust branch being curved forwardly from said exhaust splitter to a sound attenuating chamber and having one section extending parallel to one side of said vehicle, one of said exhaust outlets extending along each of said exhaust branch sections, said opening in each sound attenuating chamber facing rearwardly of said vehicle, whereby said exhaust outlets are positioned along each of said opposing vehicle sides between said front and rear wheels.

22. The improved exhaust system of claim 13 including a helical insert mounted in at least one of said exhaust pipe and said exhaust outlet, said helical insert further dissipating and attenuating the exhaust sounds within said system prior to release.

23. The improved exhaust system of claim 22 wherein said helical insert is a continuous helix mounted in said exhaust pipe upstream of said sound attenuating chamber, said exhaust gases following said helix as they flow along said exhaust pipe to create a swirling motion while sound waves are reflected by said helix.

* * * * *